(12) United States Patent
Mohammadian et al.

(10) Patent No.: US 6,590,963 B2
(45) Date of Patent: *Jul. 8, 2003

(54) MODULAR TEST INSTRUMENT

(75) Inventors: Ali M. Mohammadian, Rockville, MD (US); David J. Royle, Silver Spring, MD (US)

(73) Assignee: Acterna, Germantown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/996,763

(22) Filed: Nov. 30, 2001

(65) Prior Publication Data

US 2002/0064255 A1 May 30, 2002

Related U.S. Application Data

(63) Continuation of application No. 09/566,123, filed on May 5, 2000, which is a continuation of application No. 08/956,123, filed on Oct. 22, 1997, now Pat. No. 6,064,721.

(51) Int. Cl.$^7$ .......................... H04M 1/24; H04M 3/08; H04M 3/22

(52) U.S. Cl. .................. 379/21; 379/22.06; 379/22.07; 379/29.1

(58) Field of Search .......................... 379/1.01, 21, 19, 379/22–29.11, 30

(56) References Cited

U.S. PATENT DOCUMENTS

| | | |
|---|---|---|
| 3,956,601 A | 5/1976 | Harris et al. |
| 4,402,055 A | 8/1983 | Lloyd |
| 4,536,703 A | 8/1985 | Jablway et al. |
| 4,651,298 A | 3/1987 | Currier |

(List continued on next page.)

FOREIGN PATENT DOCUMENTS

| | | |
|---|---|---|
| DE | 3116079 | 11/1982 |
| DE | 8703026.8 | 5/1987 |

(List continued on next page.)

OTHER PUBLICATIONS

Itronix T4000 Teletester Operator Guide, 1992.
Itronix Brochure, "T5000 EFP Handheld Mobile Workstation", undated.

(List continued on next page.)

Primary Examiner—Duc Nguyen
(74) Attorney, Agent, or Firm—Michael de Angeli

(57) ABSTRACT

A modular test instrument comprises a base unit and one of a selection of application modules, neither being capable of performing end-user functions without the other. When physically assembled to one another, the base unit and application module comprise a structurally unitary device specialized for performance of application-specific end-user functions. The base unit is generic to all types of test to be provided, and comprises a display, a power supply, a user interface, and generic software to operate the display and user interface. Each application module is connected to the base unit in the same manner, so that the same base unit can he employed with a wide variety of application modules. The application modules can be readily and conveniently removed from and assembled to the base unit. The application-specific application modules each include a physical interface for establishing signal-communicating connection to the equipment to be tested, and application-specific program data and software, including information required to provide appropriate test signals, test messages, and the like. Each application module also stores user interface software for providing an application-specific user interface. When an application module is assembled to a base unit, polling software comprised by the base unit determines the identity of the application module, and determines whether it stores any software or other program data not previously copied to the base unit's memory; if not, the copying step is begun automatically upon assembly.

61 Claims, 8 Drawing Sheets

U.S. PATENT DOCUMENTS

| | | |
|---|---|---|
| 4,837,811 A | 6/1989 | Butler et al. |
| 4,843,620 A | 6/1989 | Hagedorn |
| 4,887,260 A | 12/1989 | Carden |
| 4,894,829 A | 1/1990 | Monie |
| 4,922,516 A | 5/1990 | Butler et al. |
| 4,996,695 A | 2/1991 | Dack et al. |
| 5,121,342 A | 6/1992 | Szymborski et al. |
| 5,173,896 A | 12/1992 | Dariano |
| 5,227,988 A | 7/1993 | Sasaki |
| 5,331,136 A | 7/1994 | Koenck |
| 5,377,128 A | 12/1994 | McBean |
| 5,377,196 A | 12/1994 | Godlew |
| 5,377,259 A | 12/1994 | Butler et al. |
| 5,432,705 A | 7/1995 | Severt et al. |
| 5,511,108 A | 4/1996 | Severt et al. |
| 5,521,958 A | 5/1996 | Selig et al. |
| 5,528,660 A | 6/1996 | Heins et al. |
| 5,533,093 A | 7/1996 | Horton et al. |
| 5,557,539 A | 9/1996 | Fitch |
| 5,566,088 A | 10/1996 | Hersher |
| 5,567,925 A | 10/1996 | Koenck |
| 5,583,912 A | 12/1996 | Schillaci et al. |
| 5,602,750 A | 2/1997 | Severt |
| 5,608,644 A | 3/1997 | Debacker |
| 5,757,680 A | 5/1998 | Boston |
| 5,790,432 A | 8/1998 | Morys |
| 5,805,571 A | 9/1998 | Zwan |
| 5,850,209 A | 12/1998 | Lemke et al. |
| 5,864,605 A | 1/1999 | Brownmiller |
| 5,884,202 A | 3/1999 | Arjomand |
| 5,892,458 A | 4/1999 | Anderer et al. |
| 5,916,287 A | 6/1999 | Arjomand et al. |
| 5,920,608 A | 7/1999 | Minegishi |
| 5,946,641 A | 8/1999 | Morys |
| 5,956,385 A | 9/1999 | Soto |
| 6,038,520 A | 3/2000 | Schoonover |
| 6,064,721 A * | 5/2000 | Mohammadian et al. |

FOREIGN PATENT DOCUMENTS

| | | |
|---|---|---|
| DE | 3743446 | 12/1987 |
| DE | 3912230 | 4/1989 |
| DE | 3933222 | 10/1989 |
| DE | 4025417 | 8/1990 |
| DE | 19509690 | 3/1995 |
| DE | 19545239 | 11/1995 |
| EP | 0053561 | 12/1981 |
| GB | 0532346 | 9/1992 |

OTHER PUBLICATIONS

Itronix Brochure, "One Good Thing Deserves Another", 1992.

Itronix Brochure, "These Problems are History", 1989.

* cited by examiner

PROCESSOR SUBSYSTEM

COMMUNICATION SUBSYSTEM

AUDIO SUBSYSTEM

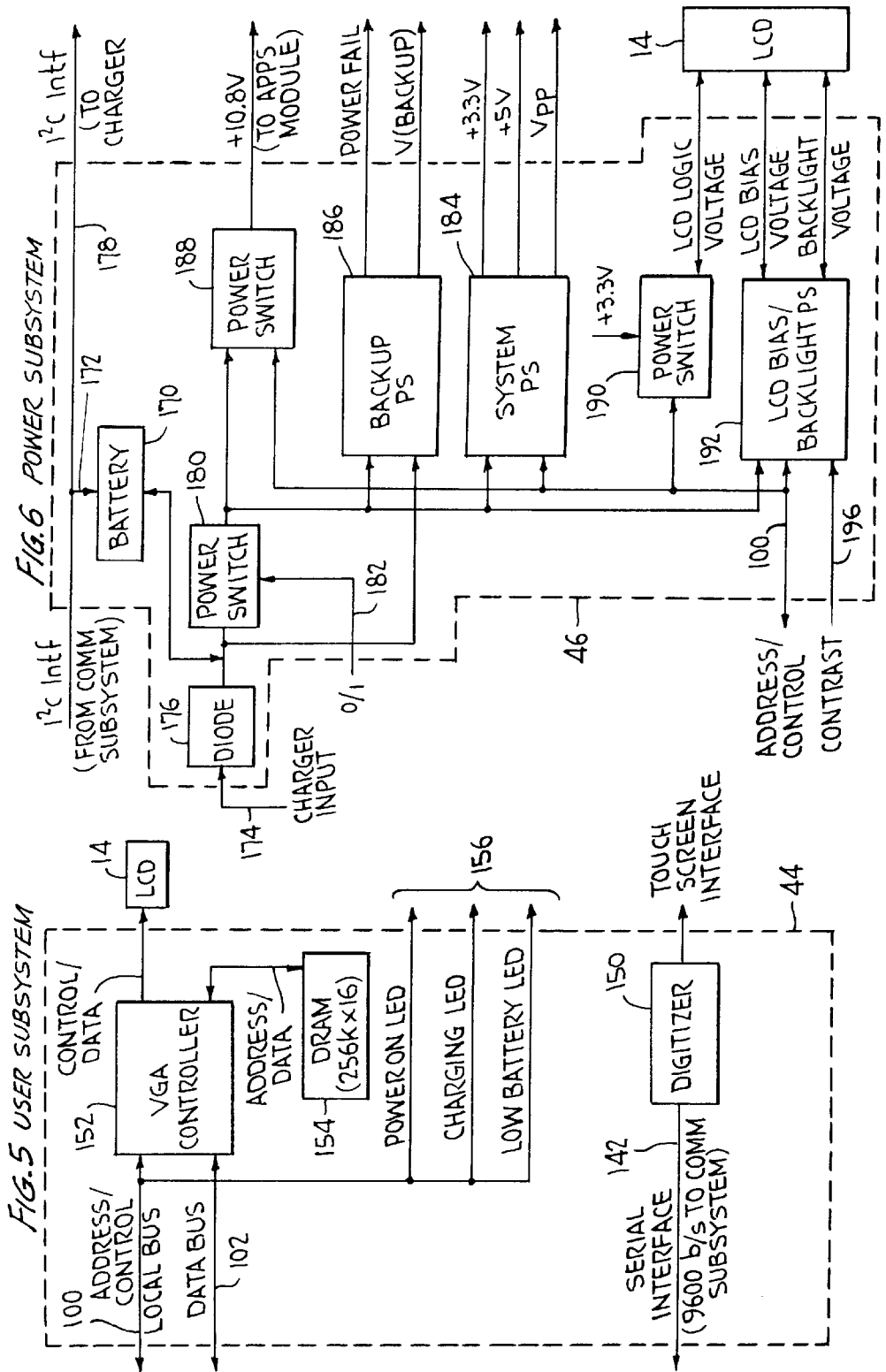

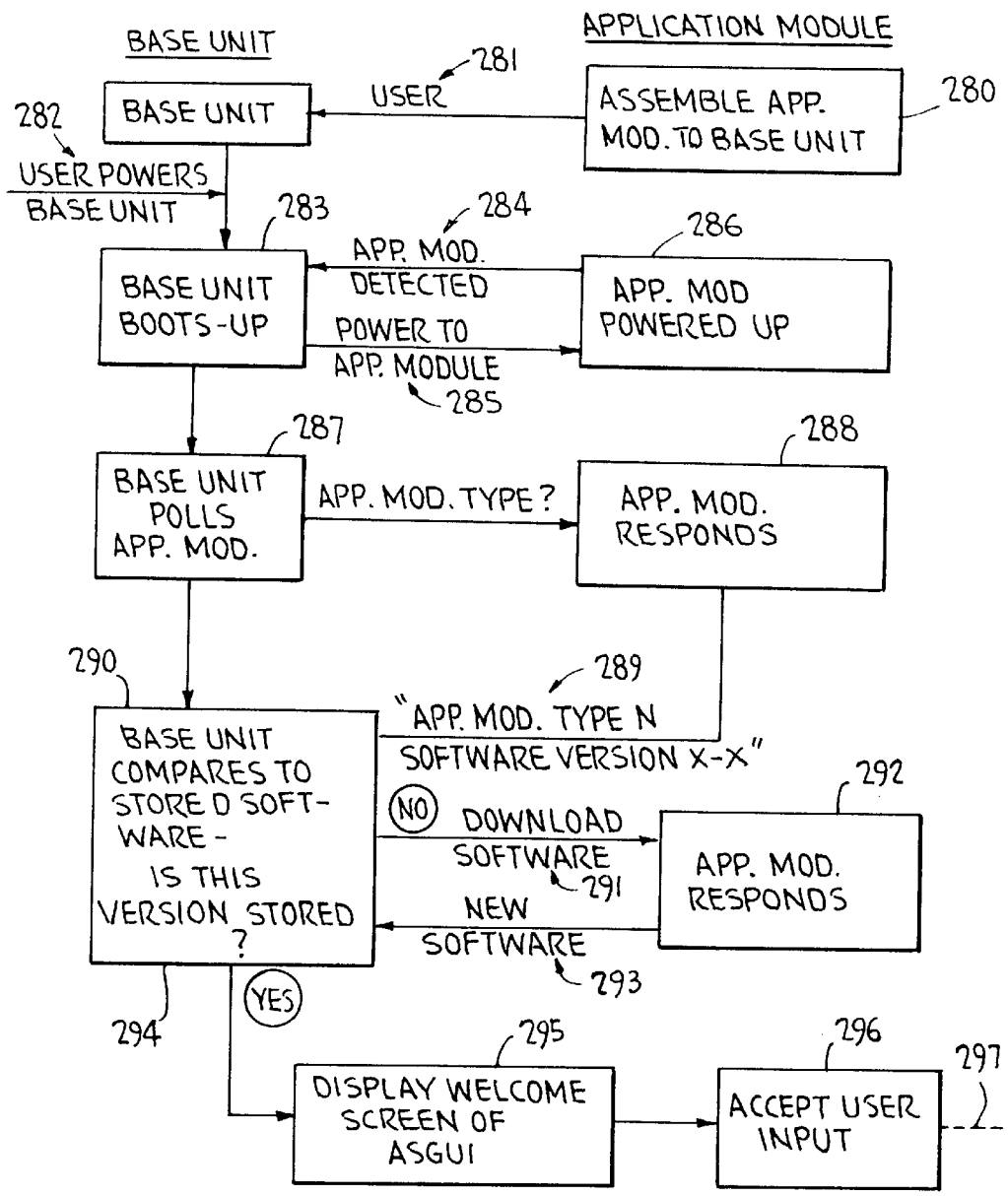

MODULAR TEST INSTRUMENT

This application is a continuation of application Ser. No. 09/566,123, filed May 5, 2000, which is a continuation of application Ser. No. 08/956,123, filed Oct. 22, 1997, now U.S. Pat. No. 6,064,721.

FIELD OF THE INVENTION

This application relates to a modular test instrument, wherein a base unit providing certain non-application-specific functions is specialized for a particular application by assembly thereto of an application module.

BACKGROUND OF THE INVENTION

With the proliferation of a wide variety of microprocessor-and computer-controlled equipment there has arisen a need for correspondingly complex test and diagnostic equipment. More specifically, equipment from appliances to automobiles, elevators to automatic teller machines, building HVAC equipment to gasoline pumps, and of course a wide variety of computer and communication equipment per se, is now provided with unprecedented functionality through extensive use of complex electronics, particularly microprocessors. Testing such complex equipment requires correspondingly sophisticated test equipment.

While the specific test methodology to be employed varies widely, in general a test instrument specialized to the equipment to be tested is connected thereto by way of a physical interface, such that a microprocessor of the test instrument is in signal-communicating relation to the circuitry of the equipment. Appropriate test conditions are then created—for example, in testing an automatic teller machine, the test technician might simulate a particular type of transaction—and the test instrument will monitor the response of the equipment. In the telecommunication connection, the testing may involve monitoring ongoing traffic; injection of predetermined test messages, to monitor the system's response; measuring operational parameters, such as bit error rates, message travel times and the like; or monitoring, the operation of individual components of the system.

As noted, as a rule the test instrument employed for testing given equipment is specialized thereto, that is, is useful only for testing a specific type of equipment or perhaps a class of related equipment. Automobile manufacturers, for example, provide their dealers and authorized repair shops with new computers for testing and diagnosing the engine management systems of each new class of cars, i.e., as the electronics of each new generation of cars become more sophisticated, the dealers must upgrade their computers accordingly. Moreover, each manufacturer employs a unique format not only for the physical interface, but also for the data formats used, the microprocessor architecture, and so on, so that each instrument is usable only with a single manufacturer's vehicles.

In general, such test instruments comprise a user interface for communicating information to and receiving instructions from the technician. Information is usually communicated to the user by way of a display screen; input may be accommodated by way of a keyboard or keypad, by the user's scrolling along a list of possible choices, by pointing to a specific region on a graphical user interface (GUI) with a "mouse", "trackball", or other pointing device, or, if the display is touch-sensitive, by simply contacting the defined regions. In most cases, the user interface is designed to "prompt" the user through an appropriate sequence of "screens" so as to select a particular test to be performed, determine various parameters, control the disposition of the results, and the like.

It has not escaped the attention of the art that despite their wide variety, most such test instruments have many common physical features, and that they differ principally in the physical interface used to make the connection to the equipment under test and in the software required to perform the test and to define the user interface. In particular, the art has recognized that substantial savings could be realized if a common unit, including generic components such as a display screen, power supply, and user input interface, could be "customized" for a particular application by addition thereto of physical interface hardware and internal and user interface software.

For example, a number of devices have been offered for telecommunications testing wherein a basic unit is "customized" for testing devices obeying varying protocols. Here the basic units have typically been "laptop" personal computers adapted for testing of particular devices by plug-in memory cards and/or supply of floppy disks providing the corresponding software. Such plug-in cards are normally rather delicate, and the floppy disks are susceptible of loss or physical damage. See generally U.S. Pat. No. 5,121,342 to Symborski; Schillaci et al U.S. Pat. No. 5,583,912; Horton et al U.S. Pat. No. 5,533,093; Selig et al U.S. Pat. No. 5,521,958; and Heins U.S. Pat. No .5,528,660.

U.S. Pat. Nos. 5,432,705 and 5,511,108, both to Severt et al, show an "administrative computer" for storing work order information, customer addresses and the like, and which can be coupled to test equipment for recording test results. In a second embodiment of this device, shown in the '108 patent, the administrative computer is divided into two mating portions 402 and 404 and a "slice" 438 can be inserted and assembled therebetween. See FIGS. 12, 13, and 24 of the '108 patent, and the specification at cols. 9–12. As discussed at col. 9, line 45, the slice "contains circuitry and devices to facilitate testing, maintaining or installing telephone lines or equipment." The slice includes the physical connection to the circuit to be tested; see FIG. 18 and the specification at col. 11, lines 1–5.

The '108 patent states explictly that other types of slice could be provided for testing equipment other than telephone equipment per se, such as "fiber optic systems, . . . non-telephone communications systems . . . for supporting general field servicing of electrical devices, e.g., copiers, printers, computers, faxes and the like . . . Although only one slice is provided in the depicted embodiment, it is possible to configure a computer to accomodate more than one slice, to provide a plurality of capabilities . . . Slices can also be provided which enhance the capabilities of the basic computer . . . such as . . . additional memory, co-processing capabilities, networking capabilities or the like." Col. 23, lines 39–56.

The device shown in the '108 Severt et al patent is essentially a complete computer that can be adapted for any of a variety of specific uses by assembly of a particular slice. This is evidently not intended to be performed repetitively; note the complicated assembly arrangements shown by FIG. 24. It is therefore clear when the slice has been assembled, the unit has essentially been dedicated to the particular use. This significantly limits the utility of the device; for example, there are numerous occasions in the telecommunication industry at which two different types of communications systems meet, as where a satellite "downlink" is interfaced to a land line. It would be highly desirable to provide a technician with a single instrument capable of ready and convenient adaptation to testing both types of equipment.

Other generally relevant patents can be summarized as follows:

Debacker U.S. Pat. No. 5,608,644 shows a simulator and method for testing system software of a communication system. The software employed is divided into "program modules" for testing various system functions.

Dariano U.S. Pat. No. 5,173,896 shows a T-Carrier Network Simulator for training technicians by simulating various network faults. It appears that various faults are simulated by plugging "smart jacks" emulating various circuit characteristics into the simulator.

Butler et al U.S. Pat. No. 5,377,259 shows a data terminal for field use by technicians capable of downloading software, work orders, and the like from a host computer over a normal telephone line. Various communication protocols are stored by the unit. Additional Butler U.S. Pat. Nos. 4,837,811 and 4,922,515 are generally similar.

Dack et al U.S. Pat. No. 4,996,695 shows a test device for testing circuits in which a shift register is provided to compensate for delays introduced in testing.

Fitch U.S. Pat. No. 5,557,539 shows an instrument for testing voice mail systems. A memory stores a number of test procedures.

Jablway et al U.S. Pat. No. 4,536,703 shows test instruments for detecting shorts and opens in multiple wire sets. Two instruments at spaced locations may be used simultaneously.

Harris et al U.S. Pat. No. 3,956,601 shows use of paired telecommunications analyzers at opposite ends of a connection. One inserts a predetermined test signal, and the other detects the signal.

OBJECTS OF THE INVENTION

It is therefore an object of the invention to provide an improved modular test instrument, wherein a base unit comprising certain generic components and software can be adapted to performance of any of a variety of applications upon assembly thereto of a corresponding application module.

It is a further object of the invention to provide such a modular test instrument wherein the application modules can be readily and conveniently interchanged, to provide increased versatility in use.

It is a further object of the invention to provide a modular test instrument that does not require use of floppy disks, plug-in memory or other cards, or other additional equipment, to perform useful test functions, in order to simplify the design, construction, and, in particular, the operation of the instrument.

A further object of the invention is to provide such a modular test instrument wherein each application module includes application-specific program data and software, so that an application-specific user interface is displayed by the base unit upon assembly of the application module to the base unit.

A further object of the invention is to provide new methods of performing testing of sophisticated equipment using instruments comprising a generic base unit specialized to the task by assembly of a corresponding application module.

SUMMARY OF THE INVENTION

1. Definitions and Examples of Terminology

The following definitions and examples of terminology used herein, which are to be considered inclusive and non-limiting, are provided to simplify the reader's understanding of the invention and its relation to the prior art discussed.

The present invention relates to application-specific instruments or computers for performing certain end-user functions in the context of certain applications. In the particular embodiment described in detail below, the instrument is a test instrument for testing telecommunications apparatus, communications facilities, and systems. The application is then telecommunications testing, while the end-user functions are specific tests or operations to be performed, e.g., monitoring communications on a given channel, inserting test messages to monitor the accuracy of their transmission, measuring the time of transmission of a message, or the like.

The instrument is amenable to performance of various applications, such as testing or monitoring telecommunication equipment or systems, as above, but also for testing various other classes of devices, such as automatic teller machines, electronically-controlled gasoline pumps, electronic security equipment, automotive engine management systems, credit card verification equipment, various kinds of computer equipment and peripherals, computer-controlled drafting, construction, fabricating, and assembly equipment, domestic and commercial appliances, and many additional types of device amenable to testing or diagnostic procedures for verifying proper operation of electronic circuit components and accompanying software, and where appropriate, verification of the operation of associated mechanical components.

In each case, the intent of the invention is to provide an integrated instrument for electrical connection through an application-specific physical interface to the equipment, system, or device being tested or monitored. The instrument comprises an application-specific user interface for guiding a technician or other user in properly performing the test. Typically the user interface of the instrument will include a touch-sensitive display for both prompting the user to select a test to be performed and to allow the user to input various data items required, as well as displaying the test results; however, the same functions could be provided by a display screen and a separate user input device, such as a keyboard or keypad, or a mouse, trackball, or other pointing device.

In order that common components can be used to perform a number of different applications, the instrument comprises a non-application-specific base unit comprising the user interface, again typically a touch-screen display for displaying information, prompting the user, and accepting user input. The base unit also comprises non-application-specific software for operating the display and accepting user input, a power supply, external communication devices, and other software and equipment for non-application-specific functions. The base unit is not itself capable of carrying out any end-user functions, though it can be capable of certain other non-application-specific functions, such as receiving upgraded software, downloading archival data having been copied from a particular device during testing, or the like.

The base unit is specialized, that is, becomes part of an application-specific instrument, when it is combined with an application module. Each application module mates physically with the base unit to form an integrated test instrument; signal-communicating connections between the base unit and application module are made simultaneously upon their assembly. Each application module is specific to a given application supporting a number of related end-user functions. For example, if the application is telecommunications testing, the end-user functions may include monitoring particular communications for accuracy, monitoring round-trip travel time of messages between specified points in the system, measuring bit-error rates, and the like. Differing application modules are provided for testing telecommunication systems or equipment obeying different communication protocols, whereby the bit rates, logic levels, and like standards provided by the physical interface of each application module vary in accordance with the specific system or equipment involved.

In order to most conveniently prompt the user to select appropriate end-user functions, define appropriate tests, and the like, each application module stores application-specific program data and software cooperating with the non-application-specific, generic software and equipment of the base unit to support the various application-specific end-user functions appropriate to the application to be supported. The application-specific program data and software will typically include application-specific user interface software cooperating with the generic user interface software stored by the base unit to provide an application-specific user interface, that is, a user interface prompting the user for data and selections appropriate to the specific device or system under test.

Preferably, the combination of the base unit and application module comprises sophisticated software and sufficient processing power to define a graphical user interface (GUI). GUI software defines regions on the display screen whereby the user is prompted to make various selections, provide required input data and the like by indicating corresponding areas of the screen (as opposed to less sophisticated user interfaces, e.g., wherein the user makes selections by "scrolling" through lists of possible selections). As implemented herein, each application module stores software defining an application-specific graphical user interface (ASGUI), comprising a sequence of screens through which the user is prompted to select an end-user function to be performed, input data needed to perform the end-user function, control the disposition of the result, and the like. Where the display device is a touch-sensitive display screen, the ASGUI allows user input by contact of the defined regions of the screen. Otherwise a mouse or other "pointing" device is used to select the appropriate screen regions defined by the ASGUI.

The end-user functions supported by a given application module include a wide variety of tests, monitoring procedures, downloading of archival data stored by the equipment under test, and the like, varying widely with the particular equipment. For example, in testing of automatic teller equipment, the instrument may perform various simulated transactions to verify proper operation, and may also download and store archival transaction information, for cross-correlation to similar information stored at a central site. Security equipment, such as keycard-controlled locks, may similarly be tested by introduction of a test key to verify proper detection and processing operation; the instrument may also allow downloading of stored access histories. End-user functions performed with respect to telecommunication equipment may involve monitoring ongoing communications, error rate measurement, injection of faulty or diagnostic messages into a stream of user messages to observe their disposition by the system, and numerous other options.

In each case, the application module comprises a suitable application-specific physical interface for making appropriate connection to the circuitry of the system or equipment under test, and application-specific circuitry and software as needed. In the telecommunications testing application, the application-specific physical interface may comprise ports for jumper wires making connection to test points provided on conventional equipment, or an antenna and suitable transceiving circuitry for connection to wireless equipment, e.g., cellular telephone equipment.

Other applications will necessitate different physical interfaces, of course; in the context of testing automotive engine management systems, the application module will typically include a cable to be plugged into a multipin receptacle connected to the engine management computer. In verifying the operation of credit-card verification equipment normally connected to a remote computer by the telephone system, the application module may include a credit-card-shaped test object having known codes stored thereon, and male and female telephone connectors allowing the instrument to conveniently be interposed between the device to be tested and the telephone line.

The application-specific program data and software stored by each application module similarly includes all information for carrying out the end-user functions relevant to the corresponding application, in addition to the information necessary to support the ASGUI. For example, an application module for testing of telecommunications apparatus, communications facilities or systems operations obeying the so-called "T1" protocol (this referring to an international standard governing such physical parameters as message format, "high" and "low" bit levels, permissible distortion of pulse shape and timing during transmission, and the like) will store the corresponding functional information needed to perform suitable tests.

Similarly, the application-specific circuitry and software in the context of testing communications equipment includes components to generate pulses conforming to the communication protocol, software to assemble such pulses into suitable test messages, timing circuitry to measure time delays experienced by particular test messages, error detection circuitry for monitoring the integrity of test messages, and the like.

The application-specific program data and software may also include libraries of stored tests, i.e., collections of parameters of commonly-performed tests, so that the user may simply choose a test from the library, rather than specify each parameter separately, and may include previously-stored archival and status data, information correlating specific items of equipment to specific test results stored, results of previous tests (e.g., to allow comparison of replaced and replacement components) and the like.

2. Summary of the Invention

The objects of the invention mentioned specifically above, and others appearing as the discussion below proceeds, are met by the present invention, wherein a base unit and one of a selection of application modules, neither being capable of performing end-user functions without the other, are physically assembled to one another to form a structurally unitary device specialized for performance of various application-specific end-user functions.

It is highly desirable that such a device be self-explanatory to a user insofar as possible, so that a user can use the instrument (with differing application modules as needed) to perform such processes with respect to a variety of differing equipment without extensive specialized training.

The base unit is in effect generic to all types of test to be provided, and comprises a display, a power supply, a user interface, and generic software to operate the display and user interface. Each application module is connected to the base unit in the same manner, so that the same base unit can be employed with a wide variety of application modules. The application modules can be readily and conveniently removed from and assembled to the base unit.

The application-specific application modules each include a physical interface for establishing signal-communicating connection to the equipment to be tested, and application-specific program data and software, including information required to provide appropriate test signals, test messages, and the like. Each application module also stores user interface software for providing an application-specific user interface operating in conjunction with the generic display software comprised by the base unit to provide an application-specific user interface, operating in a highly intuitive fashion, e.g., prompting the user to make appropriate selections and input required data to carry out the selected tests.

When an application module is assembled to a base unit, polling software comprised by the base unit determines the identity of the application module, and determines whether it stores any software or other program data not previously copied to the base unit's memory; if not, the copying step is begun automatically upon assembly. Accordingly, the user need take no significant steps to cause an application module and base unit, after assembly to one another, to establish communication therebetween, further simplifying use of the instrument, and reducing the user training required.

Preferably, the base unit includes a power supply for both itself and the application module, and the application module stores program data and software in nonvolatile memory. Where the power supply includes a battery, a battery monitor circuit provides a low power indication when appropriate, so that the application module can latch the contents of its active registers before the data is lost.

BRIEF DESCRIPTION OF THE DRAWINGS

The invention will be better understood if reference is made to the accompanying drawings, in which:

FIG. 5 shows a block diagram of the user interface subsystem of the base module;

FIG. 6 shows a block diagram of the power supply subsystem of the base module;

FIG. 9 shows a schematic flowchart illustrating the principal steps taken upon assembly of the application module to the base unit.

DESCRIPTION OF THE PREFERRED EMBODIMENTS

As discussed above, it is an object of the invention to provide a modular test instrument, including a base module providing generic user interface, power supply, and external communication functions, and an application-specific application module. The combination of these two components, comprising an application-specific test instrument, provides a user the ability to perform a variety of test and other procedures appropriate for evaluation, diagnosis, adjustment, and/or repair of an associated apparatus, system, communication facility, or the like.

Figure 1:
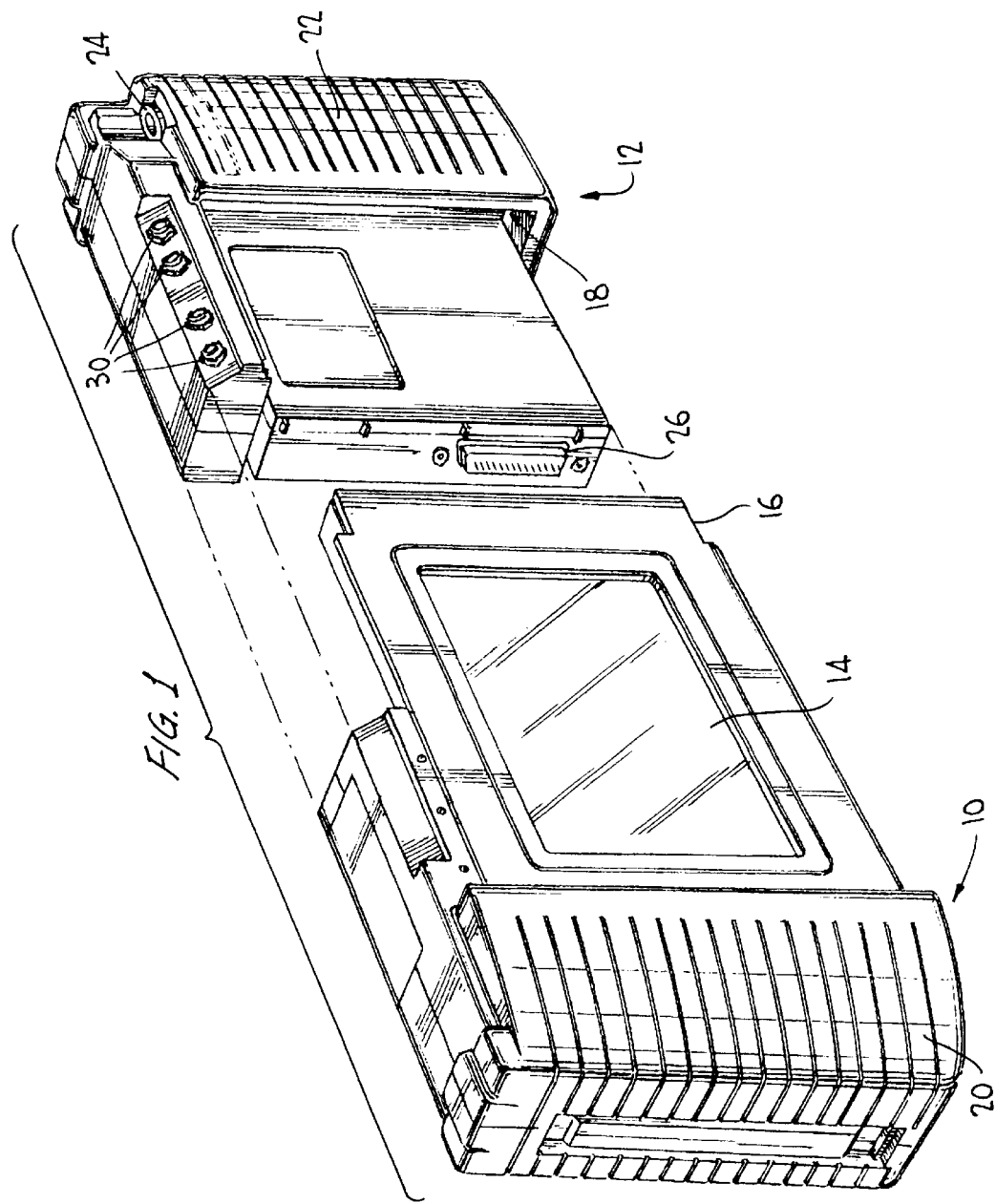
FIG. 1 shows a perspective exploded view of the base unit and an exemplary application module, which when assembled comprise an application-specific test instrument according to the invention.

As noted, it is important that the application modules be readily and conveniently removed from and assembled to the base unit. FIG. 1 illustrates a physical configuration of the base unit and application module in a preferred embodiment of the instrument of the invention providing this capability. A base unit 10 and application module 12 are conveniently assembled into a unitary instrument by sliding the application module laterally toward the base unit 10. Base unit 10 comprises a protruding tongue 16 received within a cavity 18 in application module 12; locks (not shown) may be provided to prevent their accidental separation. When the assembly is thus made, a touch-sensitive display screen 14 of generally conventional type comprised by the base unit 10 is spaced between end gripping surfaces 20 and 22, on base unit 10 and application module 12, respectively; the overall assembly is sized to be comfortably carried on one's forearm, between one's palm and elbow, leaving the other hand free for data input.

In the preferred embodiment, the user accomplishes all data input by touching defined areas on touch-sensitive display screen 14. More specifically, application-specific software stored by application module 12 cooperates with generic display operating software stored by base unit 10 to define an application-specific graphical user interface (ASGUI), wherein predetermined areas are defined on the screen 14 at each stage in selection or performance of a given test or other procedure. The user can then provide appropriate input by touching a selected region on the display screen 14. A stylus for this purpose may be carried conveniently in an elongated bore 24 formed in the housing of the application module 12. Alternatively, other types of data input devices, including "pointing" devices such as mice, trackballs or the like, as well as keyboards or keypads, may be incorporated, at some cost in physical complexity and weight.

As noted above, all application modules are assembled to the base unit 10 in essentially the identical fashion, in order to simplify the process of removal and replacement, and to render uniform the process of copying application-specific information from the application module to the base unit. In the embodiment shown, each application module 12 comprises a conventional multipin male connector 26 mating with the corresponding female connector (not shown) on the mating surface of base unit 10; their connection is made simultaneously with assembly of the base unit and application module. A preferred list of the circuit connections thus formed is provided below.

In the preferred embodiment, when operating software comprised by the base unit detects the presence of an application module, that is, when the application module and base unit are assembled, the base unit "polls" the application module to determine the identity of the latter, and thus to determine whether the application module comprises ASGUI software not previously stored by the base unit. If so, the new software is automatically copied to the base unit, and the ASGUI appears on display screen 14. These steps are accomplished automatically, without user intervention; accordingly, when assembling a new application module, the user need simply slide it into engagement with the base unit, and wait a few moments for the ASGUI to appear, prompting further input as needed.

As discussed above, each application module includes a physical interface for establishing signal-communicating connection to the equipment to be tested. The application module 12 illustrated in FIG. 1 is intended for testing of so-called "T1" communication equipment, lines, or systems. Such equipment is typically provided with defined test points for connection of test equipment of known type; more specifically, four connections are commonly provided, allowing an instrument to be connected to "eastbound" and "westbound" transmit and receive lines. In the embodiment shown, these connections are effected by four jumper wires connected to the instrument at four jacks 30.

It will be apparent to those of skill in the art that the details of the physical interface to the equipment to be tested are necessarily application-specific and so vary from one application module to the next. All types of devices or instrumentalities for providing effective signal-communicating connection to equipment to be tested, as well as other devices for providing, for example, appropriate signal inputs to such equipment, are therefore to be understood as within the physical interface provided as part of each application module according to the invention.

For example, in verifying operation of a credit-card reader it would typically be necessary to provide a "test card" having predetermined information stored thereon, as well as a circuit connection interposed between the device and the telephone line, so as to intercept and verify the device's response to the test card. Similarly, in testing computer equipment, for example, in testing a printer, it might be desirable to provide connection to the printer's input port, to provide a known series of command characters, text, drawings, and the like, and also to provide connection to the printer's internal circuitry, to determine the location of any flaw. In other cases, the physical interface may be provided by an antenna and transceiver for establishing wireless signal-communicating connection, e.g., for testing cellular telephone equipment. These and numerous other types of physical interface are therefore within the scope of the invention.

Completing the discussion of the physical characteristics of the preferred embodiment of the invention shown in FIG. 1, base unit 10 comprises jacks for external communication (not shown), such as a jack for connection of a printer or a communication cable conforming to the well-known RS-232C standard. Such a connection can be employed for downloading stored data, e.g. archival data copied from equipment during testing, for receiving software upgrades, or the like. Base unit 10 also includes a substantial battery, for operating both the base unit and an associated application module, as well as a jack for connection of an external power supply and/or battery charger.

Base unit 10 may also include one or more ports for connection of expansion components, such as those conforming to the well-known "PCMCIA" standard; these can be used from time to time as needed for temporary connection of modems for communication, supply of replacement or upgraded base unit software, and the like. However, it will be appreciated that according to an important object of the invention such devices are not required for normal field operations, as they are rather fragile. Use of floppy disks to support particular test operations is also avoided according to the invention, as these too are fragile and subject to being lost.

Figure 2:
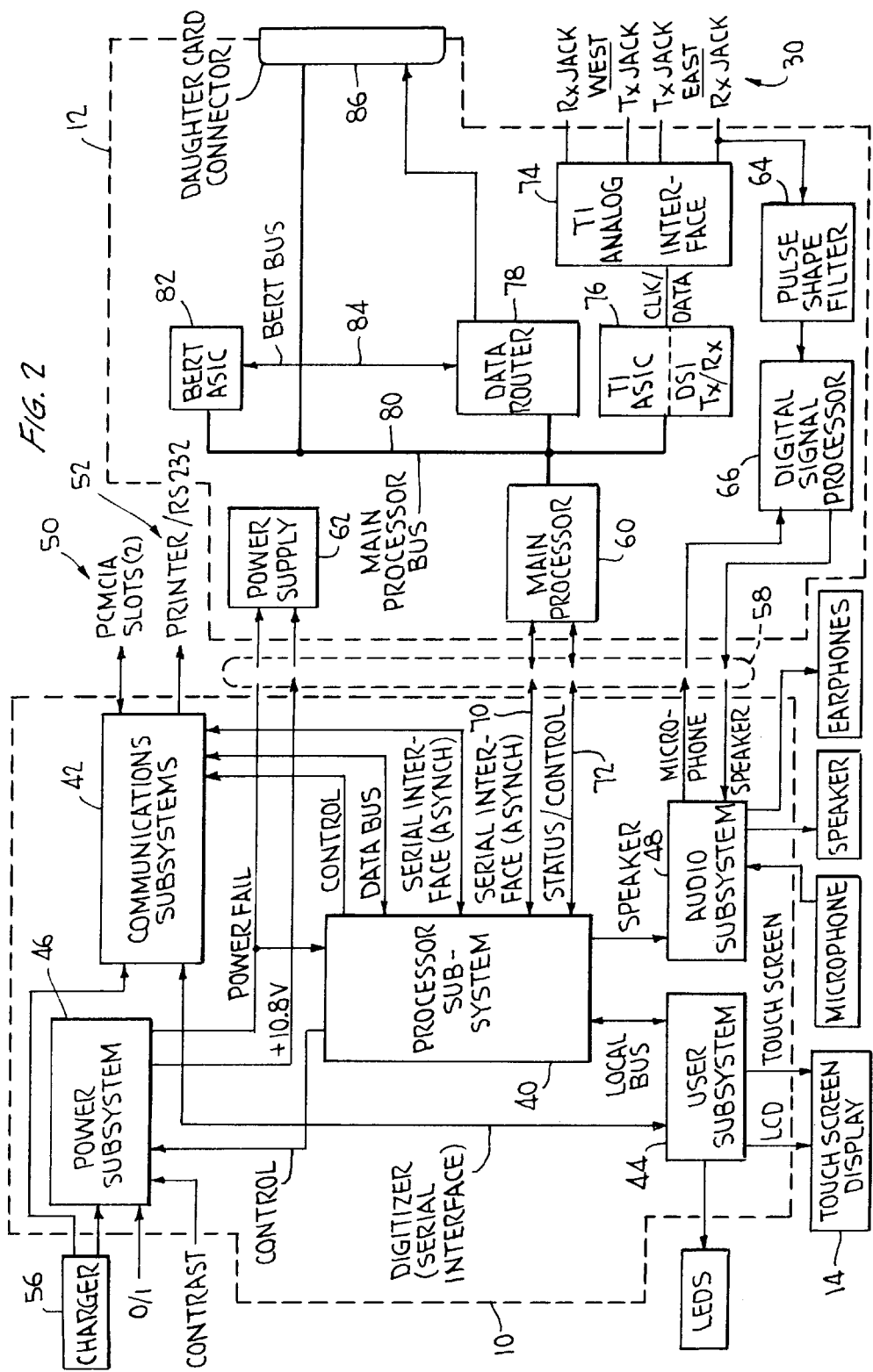
FIG. 2 shows a block diagram of the principal components of the base unit and an application module, in this embodiment intended for testing of so-called "T1" communication equipment, and illustrates schematically their connection to form an application-specific test instrument according to the invention.

FIG. 2 shows in block diagram form the principal functional components of the base unit 10 and the application module 12, the latter again being shown in an embodiment intended for testing of T1 communication equipment or systems. As illustrated, the base unit 10 comprises five principal subsystems: a processor subsystem 40, a communications subsystem 42, a user subsystem 44, a power subsystem 46, and an audio subsystem 48. These subsystems are detailed below with respect to FIGS. 3–7, respectively.

The principal function of the processor subsystem 40 is to provide a platform for operation of the user interface software, including both the generic software stored by base module 10, and the application-specific software stored by the application module 12 and copied to the base unit 10 as needed upon their assembly. The processor subsystem also provides direct communication connection to the main processor 60 of the application module 12, as illustrated, and supports the communication subsystem 42 for external communication as needed from time to time. In the presently preferred embodiment, the processor subsystem is built around an Advanced Micro Devices (AMD) SC400 single chip microprocessor, essentially compatible with the well-known Intel Corporation 486SX microprocessor. Use of this "PC-compatible" chip is desirable as this allows software development using conventional PC techniques. Further details of the processor subsystem 42 are provided below in connection with FIG. 3.

The communications subsystem 42 provides an interface 50 to PCMCIA cards, used to provide modem and other functions not normally required during field operations, and an interface 52 for a printer or RS-232C communication facility. As can be seen, the communication subsystem is powered by direct connection to a battery charger 56, again, normally not used during field operations. Further details of the communications subsystem 42 are provided below in connection with FIG. 4.

The user subsystem is detailed further below with reference to FIG. 5; its principal function is that of providing the interface between the processor subsystem 40 and the preferred touch-screen display 14.

The power subsystem 46 includes a battery sufficient to power both the base unit and application module 12; the latter requires no power when disconnected from base unit 10, and is powered-up automatically when connected. The battery can be recharged by connection to a separate charger 56 at the conclusion of field operations. Further details of the power subsystem 46 are provided below in connection with FIG. 6.

Figure 7:
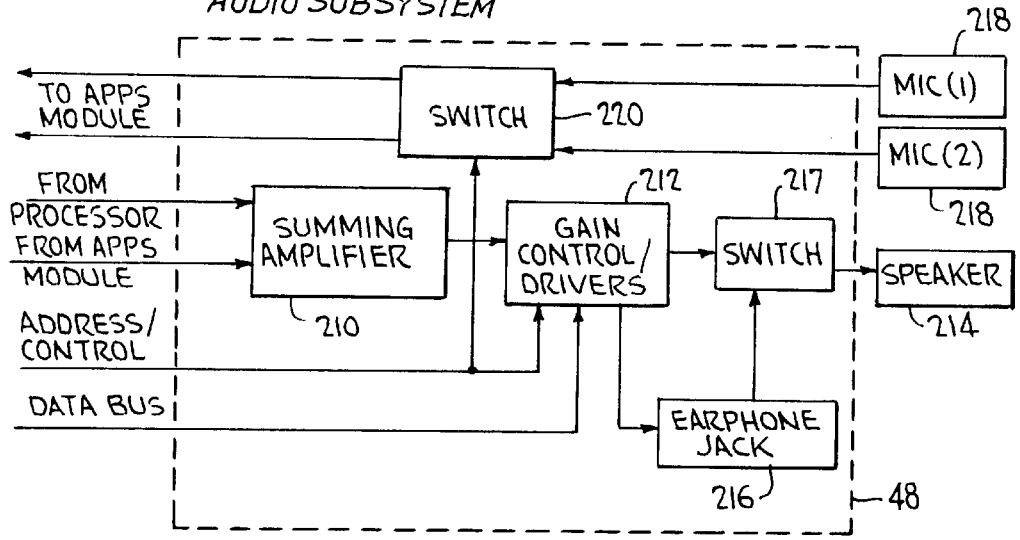
FIG. 7 shows a block diagram of the audio subsystem of the base module.

Finally, the audio subsystem 48, detailed below in connection with FIG. 7 below, provides system notification tones, used to alert the user, and provides a microphone interface.

Turning now to details of the connection between base unit 10 and application module 12, as discussed above the connection is made as indicated at 58 upon assembly, when a male connector 26 (FIG. 1) comprised by application module 12 mates with a female connector comprised by base unit 10. It will be appreciated that numerous alternative connection arrangements are within the scope of the invention.

In the preferred embodiment depicted, the processor subsystem 40 of the base unit is connected by an asynchronous serial interface 70 and status and control lines 72 to the main processor 60 of the application module 12. Connections are also provided between the power subsystem 46 of the base unit and the power supply 62 of the application module; as noted, all power required by application module 12 is supplied by the power subsystem 46 of the base unit. In the embodiment of application module 12 shown, one of signal connection jacks 30 is connected, by way of a pulse shape filter 64 and a digital signal processor 66, to the audio subsystem 48; this allows frequency analysis of voice traffic on an associated communication line.

As noted, the application module 12 shown is intended for testing of T1 communication equipment, facilities, and/or systems. Accordingly, jacks 30 provide connections to eastbound and westbound transmit and receive lines. Jacks 30 are connected to a T1 analog interface chip 74, where basic analog signal level measurement and signal reconstruction are performed. (It will be appreciated that T1 testing per se is well known; the test functions provided by application module 12 are not themselves claimed to be novel.) The reconstituted signal is provided to a T1 application-specific integrated circuit (ASIC) 76, providing framing and analysis of of the reconstructed bitstream. T1 ASIC 76 and main processor 60 are connected to a data router 78 by a main processor bus 80, providing parallel data transmission. Main processor 60, which may comprise a Motorola 68360 microprocessor chip, provides communication with base unit 10 and controls the overall operation of application module 12. Data router 78 selects portions of the recovered bitstream according to desired bandwidth (i.e., allowing selection between messages transmitted simultaneously). A bit error rate test(BERT) ASIC 82 connected to data router 78 by a BERT bus 84 counts errors in the recieved data stream and provides a variety of test patterns for transmission onto the T1 network, to evaluate the response of the network to known "problem" bit patterns. Again, the test procedures supported by the application module are not themselves claimed to be novel. Finally, a daughtercard connector 86 may be provided, allowing convenient access to main processor bus by external elements, for testing of the instrument, upgrading the application-specific software stored by the application module 12, and the like.

Figure 3:
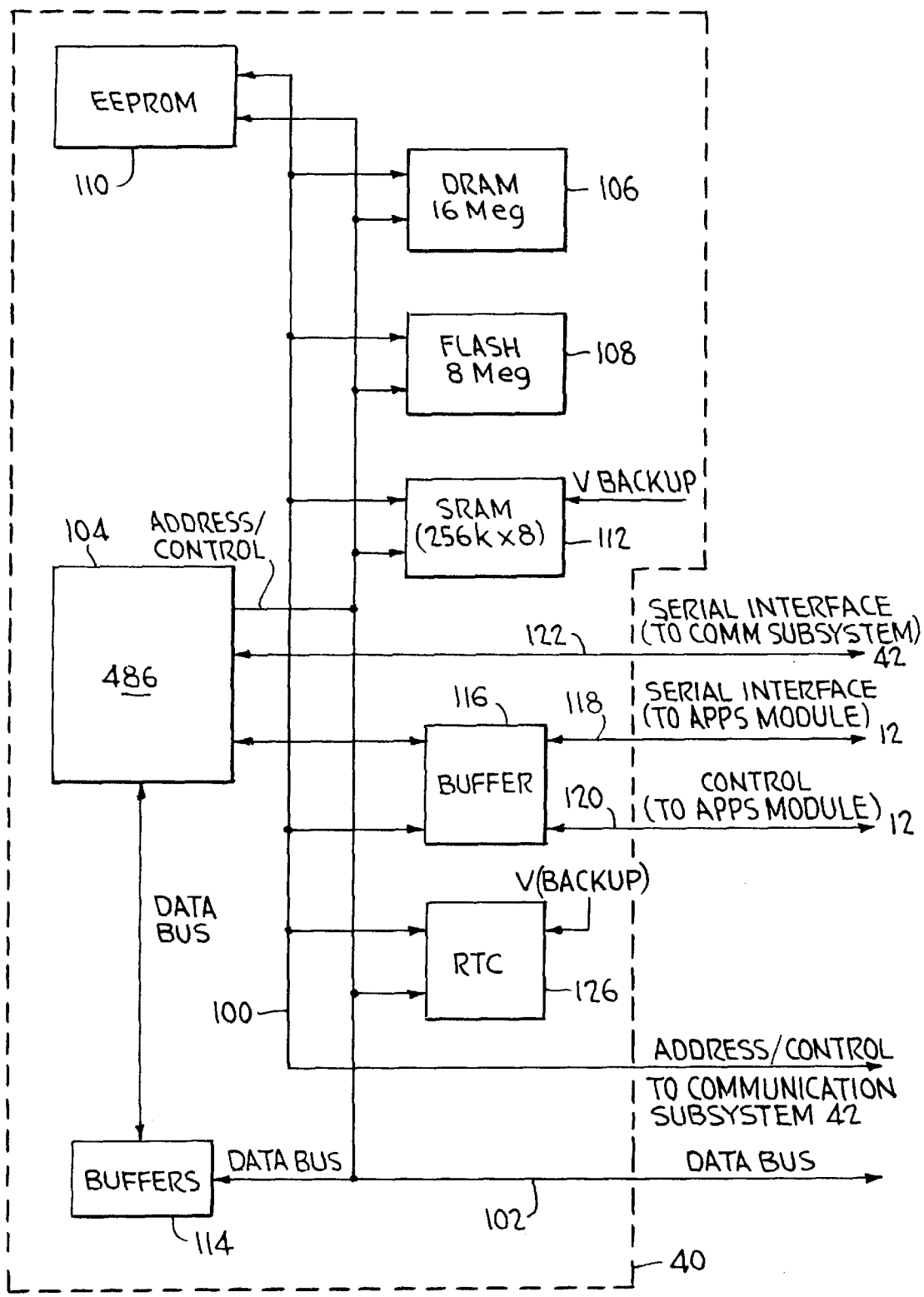
FIG. 3 shows a block diagram of the processor subsystem of the base module.

FIG. 3 shows schematically the principal components of the processor subsystem 40, and its connections to the other components or subsystems of the instrument. As illustrated, and as generally conventional, the components are all connected to an address/control line 100, providing control signals, and a data bus 102, over which data, for example, flows in response to a particular request from one component to another.

The components connected by way of the address/control line 100 and data bus 102 include processor 104. As above, in the preferred embodiment processor 104 is implemented by an Advanced Micro Devices (AMD) SC 400 single chip microprocessor, essentially compatible with the well-known Intel Corporation 486SX microprocessor, allowing standard "PC" architectural and design practices to be followed.

Several distinct types of solid-state memory components are also connected to the address/control line 100 and data bus 102, including: 4–16 megabytes of dynamic random access memory (DRAM) 106; high-speed "flash" memory 108, including up to 16 megabytes of general-purpose memory, equivalent to the typical magnetic memory used by conventional PC operating systems to contain the ASGUI and operating software, including the basic input/output system (BIOS), the disk operating system (DOS) (required by operating software developed on conventional PC's, even though there is no disk per se), and Windows, and including 256 kilobytes of "boot" flash memory, i.e., for storing basic start-up routines for initializing the instrument on power-on; a non-volatile, static random-access memory (NVRAM or SRAM) 112, storing setup information and results generated during operation in the event of a power loss; and electrically-erasable programmable read-only memory (EEPROM) 110, for storing the instrument's serial number and other factory-set information.

Figure 4:
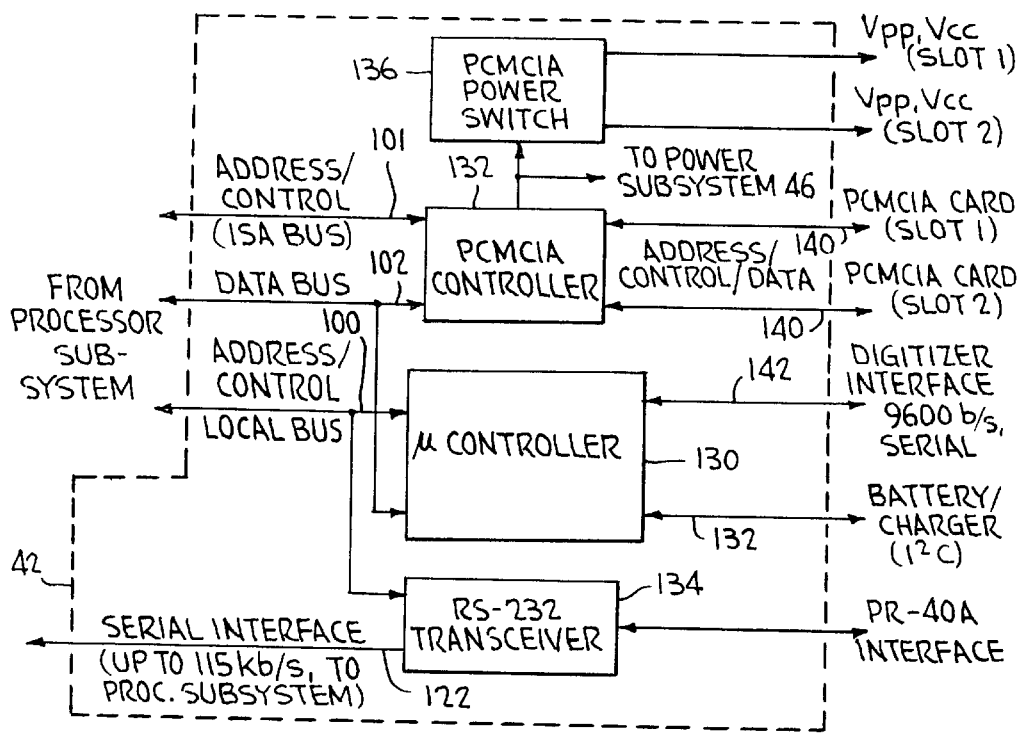
FIG. 4 shows a block diagram of the communication subsystem of the base module.

As shown, the address/control line 100 and data bus 102 both extend between the processor subsystem 40 and the communication subsystem 42 (see FIG. 4). Serial interface line 118 and control lines 120, both buffered in buffer 116, provide connection to the application module. Buffer 114 is provided between processor 104 and data bus 102. Buffers 114 and 116 are provided to allow asychronous operation.

A real-time clock (RTC) 126 provides a time signal as needed; both RTC 126 and SRAM 112 are provided with separate battery backup indicated at V, to preclude loss of information in the event the main battery fails or is removed.

FIG. 4 shows a block diagram of the communications subsystem 42. As illustrated, the principal components of communications subsystem 42 are a microcontroller ("µcontroller") 130, a PCMCIA controller 132, a RS-232 transceiver 134, and a PCMCIA power switch 136. As shown, microcontroller 130 is connected to the processor subsystem 40 (FIG. 3) by address/control bus 100 and data bus 102, while PCMCIA controller 132 is connected by data bus 102 and address and control bus 101. The PCMCIA controller is a standard component used to interface PCMCIA cards to processors, in this case main processor 104 (FIG. 3); as can be seen two slots 140 are provided for insertion of PCMCIA cards. Such cards are an industry-standard way of temporarily adding functions, e.g., modem capability, to PC-compatible computers. As noted above, according to an important object of the invention, such cards are not used during ordinary field operation of the instrument, due to their relative fragility, but are used only from time to time. For example, a PCMCIA modem might be temporarily connected to allow downloading of updated software, or to communicate archival data copied from equipment under test to a remote location.

As indicated, the PCMCIA power switch 136 provides a power connection between the power subsystem 46 and the PCMCIA cards when used. Power switch 136 preferably provides differing supply voltages as needed by various PCMCIA cards.

As indicated at 132, microcontroller 130 provides a control signal ($I^2C$), indicative of the battery's level of charge, to an external battery charger (see FIG. 6 for details), and the interface between the main processor 104 and the digitizer 150 (FIG. 5) providing control signals responsive to the user's touching display screen 14 (FIG. 1). Microcontroller 130 may also be employed to drive various system status LEDs, support contrast and backlight control inputs to the display 14, and the like.

RS-232 transceiver 134 provides the interface needed between a printer (as shown, complying with the PR-40A standard) and the main processor 104 (FIG. 3). Data is transferred by serial interface 122 and control signals by local bus 100.

Referring now to FIG. 5, user subsystem 44 includes digitizer 150 providing control signals in response to the user's contacting specified portions of the liquid-crystal display (LCD) screen 14 (FIG. 1). More specifically, as discussed above, the ASGUI defined by each application module includes software whereby the display screen at any given time shows various software-defined regions corresponding to various control options then available to the user. The user makes a selection by contacting the screen. Digitizer 150 detects the location of the contact, and supplies a corresponding signal to processor subsystem 40 by way of serial interface 142. Processor subsystem 40 then compares the location of the contact with the defined regions, and takes the appropriate control action.

User subsystem 44 also includes a VGA controller 152 connected by address/control bus 100 and data bus 102 to processor subsystem 40. VGA controller 152 provides control and data signals to touch-screen display screen 14, which may preferably comprise a liquid-crystal display (LCD). Controller 44 is provided with a separate DRAM 154. User subsystem 44 may also include various system status LEDs 156 driven by address/control bus 100, for the user's information.

As will be appreciated by those of skill in the art, the specific choice of digitizer 150 and VGA controller 152 will normally depend on the choice of display 14; selection and implementation of these components is within the ordinary skill of the art.

FIG. 6 shows a block diagram of the power subsystem 46. The essential functions of power subsystem 46 are to convert the fixed DC voltage provided by a battery 170 to DC of several voltages as required by various circuit components, and AC as required by typical LCD displays, to monitor the battery condition so as to store updated data before battery power is lost, to provide backup power in the latter event to maintain the contents of the SRAM 112 and RTC 126 (both shown in FIG. 3), and to monitor the condition of battery 170 and operate an associated charger as needed.

In the preferred embodiment, battery 170 is a "smart" battery, e.g., Duracell DR-15, providing an I²C signal, indicative of the level of charge of the battery, used to control a charger. That is, in normal use, battery 170 provides sufficient stored power for a day's work; at the end of the day, the user connects an external battery charger (not shown) to port 174, connected to battery 170 via diode 176, precluding reversed-polarity connection from damaging battery 170. A thermistor measuring the temperature of the battery, and its rate of change, is provided to disable the charger, via control line 178, when battery 170 has been fully charged.

When the user closes a manual switch indicated at 182, an FET or other switching element 180 connects battery 170 to a system power supply 184 providing several DC voltages as indicated, and to a backup power supply 186, providing backup power V, as discussed above. When an application module is connected, a second switching element 188 is closed, providing power to the application module. A further switching element 190 is also connected between power supply 184 and display 14, and is operated to depower the display after a period of nonuse, reducing the overall power consumption. A LCD Bias/Backlight power supply 192 is also powered by system power supply 184, proving AC for backlighting the display, and relatively high DC as required by display 14. As indicated, LCD Bias/Backlight power supply 192 is connected to address/control line 100. A contrast control 196 may also be provided.

The audio subsystem 48 principally provides audible tones in response to control signals received, for example, from the applications module to alert the user that input is required. As shown in FIG. 7, audio subsystem 48 comprises a summing amplifier 210 connected to the processor module 40 and to the application module for receiving control inputs, and connected in turn to a speaker driver 212 for providing a drive signal to a speaker 214 provided in the base module. An earphone jack 216 may be provided as well; switch 217 disables the speaker if an earphone plug is inserted. Microphone inputs 218 may also be provided, connected through a selector switch 220 to the application module as indicated; these may be useful to inject voice signals in test of a communication system.

The following provides a tabular listing of the signals connected between the base unit and applications module when the two are assembled. These connections are implemented in the preferred embodiment using standard 25-pin connectors.

| Pin No. | Signal Name | Notes |
|---|---|---|
| 1 | Ground (Gnd) | Audio ground |
| 13 | Not used | |
| 2 | Spkr − | Speaker audio to base unit |
| 14 | Spkr + | Speaker audio to base unit |
| 3 | Mic − | Microphone audio from base unit |
| 15 | Mic + | Microphone audio from base unit |
| 4 | RTS* | Handshake to base unit (used to establish communication) |
| 7 | RX Data | Asynchronous data from base unit |
| 19 | TX Data | Asynchronous data to base unit |
| 8 | +5 V | Power from base unit |
| 20 | Pwr Int* | Loss of power warning from base unit |
| 9 | +3.3 V | Power from base unit |
| 21 | +5 V | Power from base unit |
| 10 | Battery | 10.8 V power from base unit |
| 16 | +3.3 V | |
| 5 | Gnd | |
| 17 | Gnd | Application module present |
| 6 | CTS* | Handshake from base unit (used to establish communication) |
| 18 | +3.3 V | |
| 22 | +3.3 V | |
| 11 | Gnd | |
| 23 | +5 V | |
| 12 | Gnd | |
| 24 | Gnd | |
| 25 | +5 V | |

It will be apparent to those of skill in the art that in the above RX Data and TX Data are the serial data lines over which data is transmitted between the base unit and applications module, and that the handshaking signals RTS* and CTS* are used to establish synchronization and communication therebetween, in a generally conventional manner. The PWR INT* signal is provided by the base unit responsive to detection that the battery voltage is dangerously low; the application module responds in the event of possible power loss by setting non-volatile latching "deadman" relays, connecting the input and output jacks together, thus avoiding interruption of service, and by storing key data. See FIG. 8, discussed below. The power supply voltages and ground connections are generally self-explanatory, although the presence of a ground-valued signal on pin 17, when detected by the base unit, indicates that an application module is present; power switch 188 (FIG. 6) is then opened, providing power to the application module.

Figure 8:
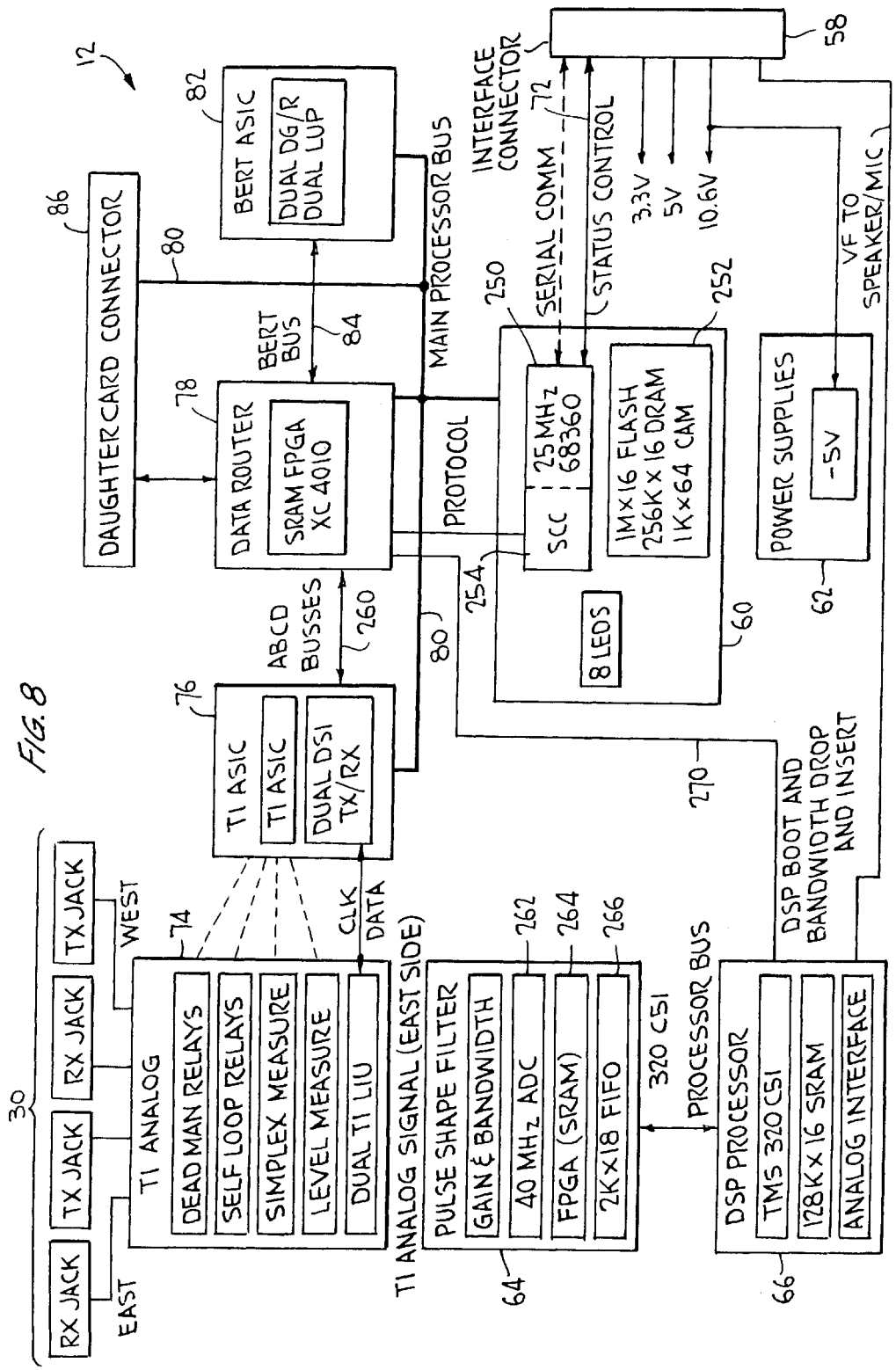
FIG. 8 shows a block diagram of an application module according to the present invention, again in an embodiment intended for testing of so-called "T1" communication equipment.

FIG. 8 provides a more detailed block diagram of the application module 12 used for T1 communications testing, as summarized in FIG. 2. Again, application modules intended for other purposes will vary significantly from that shown. As described above, the principal components of the application module 12 include a main processor 60, connected by serial communication line 70 and status/control line 72 to the main processor subsystem 40 of the base unit. As shown in FIG. 8, main processor 60 may include a microprocessor 250, supported by a memory module 252 including Flash, DRAM, and content-addressable memory (CAM) memories, and including one or more serial communications controllers 254.

Main processor 60 is connected by a main processor bus 80 to data router 78, T1 ASIC 76, BERT ASIC 82, and daughtercard connector 86, all as discussed above. In the preferred embodiment, data router 78 comprises a static random-access memory (SRAM)-based field-programmable gate array (FPGA), essentially comprising hard-wired logic for high-speed processing of received data streams. CAM is also useful in providing high-speed processing, limiting the software requirements.

More particularly, as noted above, jacks 30 provide connections to eastbound and westbound transmit (TX) and receive (RX) lines. Jacks 30 are connected to a T1 analog interface chip 74, where basic analog signal level measurement and signal reconstruction are performed; that is, the pulse-shape distortion inherent in transmission is corrected, yielding a "clean" digital signal for processing. The reconstituted signal is provided to T1 application-specific integrated circuit (ASIC) 76, comparing the timing of the reconstructed bitstream to a clock signal, thus providing framing and analysis of the recieved signal. T1 ASIC 76 is connected directly to data router 78 by separate bus 260, in addition to main processor bus 80, providing parallel data transmission. Data router 78 selects portions of the recovered bitstream according to desired bandwidth (i.e., allowing selection between messages transmitted simultaneously). A bit error rate test (BERT) ASIC 82 connected to data router 78 by a BERT bus 84 counts errors in the received data stream and provides a variety of test patterns for transmission onto the T1 network, to evaluate the response of the network to known "problem" bit patterns. Again, the test procedures supported by the application module are not themselves claimed to be novel.

Signal connection jacks 30 are connected to a T1 analog unit 74, including the deadman relays mentioned above, so that if power is lost, for example, the relays operate automatically to connect the jack pairs together, reestablishing network connections.

In the embodiment of application module 12 shown, one of signal connection jacks 30 is also connected to a pulse shape filter 64 including an analog-to-digital converter (ADC) 262 operating at 40 MHZ. ADC 262 is used to measure the distortion of the "clean" digital signal as originally transmitted; that is, during transmission the clean signal will have become distorted, resembling an irregular sine wave. ADC 262 measures the amplitude of this signal at short time intervals, as a step in measuring its distortion. The digital words resulting are stored in SRAM 264 and a first-in, first-out (FIFO) register 266. The contents of register 266 are then provided to a digital signal processor (DSP) 66 for analysis; a connection 270 is also provided to data router 78, allowing the signal to be provided to main processor 60 as needed. Digital signal processor 66 is also connected to the audio subsystem 48; this allows frequency analysis of voice traffic on an associated communication line.

As above, a daughtercard connector 86 may be provided, allowing convenient access to main processor bus 80 by external elements, for testing of the instrument, upgrading the application-specific software stored by the application module 12, and the like.

Finally, as indicated above, application module 12 includes a power supply 62, connected as indicated to the power subsystem 46 of the base unit 10; as noted, all power required by application module 12 is supplied by the power subsystem 46 of the base unit.

As mentioned above, it is an object of the invention to provide a modular test instrument wherein a generic base module can be specialized to perform any of a wide variety of application-specific user functions upon assembly of an application module thereto, and moreover, that this is to be accomplished with minimal user intervention, so as to reduce the amount of operator training required. As also mentioned above, in the preferred embodiment this is accomplished by providing each application module with specialized GUI software and operating programs and data, these being copied to the base unit as needed automatically upon assembly. FIG. 9 shows the principal steps in this process.

As indicated, the process begins at 280, when the user (as indicated at 281) assembles the application module and base unit. At 282, the user operates the power switch on the base unit. From this point forward, operation is automatic. The base unit "boots" at 283. If the base unit detects that an application module is present, by detecting the presence of a ground on pin 17 (as above) of the main connector, as indicated at 284, the base unit then provides power at 285 to the application module, which is then powered-up, as indicated at 286.

The base unit then polls the application module at indicated at 287, requesting an identification of the application module and its software revision number. The application module responds at 288 with this information, as indicated at 289. At step 290, the base unit compares this information with that stored; if the base unit has not already stored this software, it requests at 291 that the application module download the new software, accomplished as indicated at 292, 293. On the other hand, if the software stored by the application module has previously thus been stored by the base unit, as determined at 294, the base unit proceeds immediately to display a "welcome screen", that is, the first screen of the ASGUI, at 295. At this point the instrument is prepared to accept the user's initial input, at 296, and processing continues thereafter, as indicated at 297.

It will thus be appreciated that the user need only assemble the base unit and application module and turn on the power to activate the instrument, that new software can thus be provided to the base unit in a simple and efficient manner, and moreover that the downloading process need be performed only once per revision of the software. It would also be possible to operate the display and provide the ASGUI directly from the application module, but this would require a much larger and more costly connector between the application module and base unit.

Reference has been made to a particular advantage of the invention, wherein the application-specific user interface allows the user to specify a particular test by selection of a test from be explained in detail in the context of testing a communication facility.

According to the prior art, a user seeking to test a communication facility had first to select the test arrangement to be employed, then select the type of test to be performed, and finally select the parameters of the corresponding test from a number of menus, each providing a selection of optional settings for each of the parameters. Each of these selection processes involved time and careful effort, and required the operator to be suitably trained.

For example, in the context of testing a so-called T1 line using prior art instruments, the user must first define the preferred test arrangement; for example, typical prior art test instruments can be operated simply to monitor an existing communication channel, to perform "drop and insert" testing, that is, replace an existing sequence of bits with a defined test sequence, or to "loop back" incoming signals to their source. It will be appreciated that each of these test arrangements allows differing tests to be performed. The user must then define the type of test to be performed; in the monitoring context, for example, the user typically selects whether the signal is to be examined for proper "framing"—i.e., to determine whether the bits are properly synchronized—or for the proper "pattern"—whether the bits correctly obey the data protocol being employed. Finally, in many cases the user must then make selections from a number of menus of parameters, e.g., to define the allowable signal parameters as a step in determining whether the connection meets specified standards. For example, the user might typically be obliged to define the framing parameters, or the bit pattern, or if the bit rate of the signal, the signal-to-noise ratio, or the signal distortion is to be measured, to input the appropriate ranges of values for comparison. These selection steps are quite time-consuming, especially when performed repetitively, and require user training.

Figures 10A, 10B:
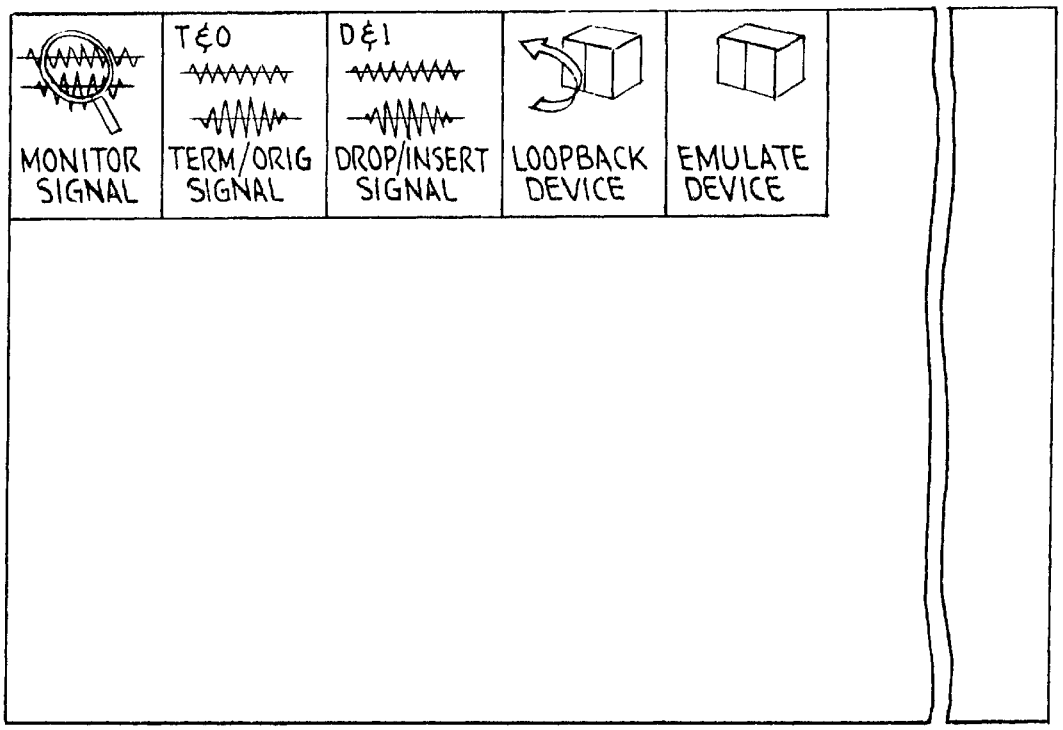
FIG. 10, comprising FIGS. 10(a) and (b), illustrates sequences of screens useful in defining particular tests to be performed.

By comparison, according to the present invention, the user need merely select the test arrangement by pressing one of a set of defined screen "buttons" (i.e., areas on the screen defined by the application-specific GUI software). See FIG. 10(a), illustrating the choices of "Monitor Signal", "Term/Orig" (Terminate and Originate), "Drop/Insert", "Loopback Device", and "Emulate Device". In response to the user's choice of one of the "application groups", the instrument of the invention then displays a choice of test applications; for example, if the user selects "Monitor Signal", the instrument provides the choice of "T1", "VF" (Voice Frequency), "GSM" (Global System for Mobile Communications), and "Cell Capture". In response to selection of a test application, e.g., "T1", a further screen is displayed. See FIG. 10(b); the legend "Monitor T1" in the lower left indicates the user's selection. At this point, the user has the option of selecting "Setup", "T1-D4", or "QRSS". If "Setup" is selected, the instrument will display menus of possible parameters to be selected, much as in the prior art instruments. However, if either "T1-D4" (corresponding to framing measurement) or "QRSS" (corresponding to verification of the proper bit pattern) is selected, the instrument immediately makes appropriate selections of parameters from a library of stored tests, preferably determined by observation of preferred test practices of skilled users. In this way the user need not spend time selecting the particular parameters of a test, and, perhaps more significantly, need not be trained in their selection; the "Setup" option preserves the flexibility of more complete parameter selection by skilled users.

A preferred embodiment of the invention having thus been described, it will be appreciated by those of skill in the art that numerous advantages are provided thereby. In particular, it will be appreciated that the instrument of the invention provides unprecedented flexibility, ease of use, and user-friendliness. To convert the instrument from one application to another, the user need only withdraw the application module in use from the base unit and assemble the new application module. This can be accomplished in seconds, without tools. The application-specific software will then be copied as needed and the display will show the new ASGUI, prompting the user. Functions are partitioned between the base unit and application module in a way ensuring that the application modules are of relatively low cost, while the base unit is adaptable to use in a wide variety of applications. It will be appreciated that while a base unit could store a variety of ASGUIs this would require enormous amounts of memory. Furthermore, providing the ASGUI software with each application module allows the base unit to remain useful for a number of years, reducing the effective cost of the instrument; that is, as new devices that will require testing are introduced, new application modules can be provided. Fragile components such as floppy disks and PCMCIA cards are not required during field operations; accordingly, they are unlikely to be lost or damaged, and the field user need not be trained in their operation. Highly sophisticated instrumentation is thus made usable by relatively untrained personnel.

While a preferred embodiment of the invention has been disclosed in detail, the invention is not to be limited thereby, but only by the following claims.

What is claimed is:

1. An instrument, comprising in combination a base unit and an application module, said base unit providing predetermined non-application-specific functions, and comprising a display device for display of a graphical user interface (GUI), said predetermined non-application-specific functions provided by said base unit including generic control functions required to operate said display device, said base unit being adapted to be assembled to a corresponding application-specific application module selected from a group thereof, each application module mating with said base unit in accordance with a predetermined physical and electrical interface, and each said application module storing application-specific program data and software, including application-specific GUI software, and providing application-specific physical interface means for providing predetermined application-specific communication with an apparatus, device, or system to be tested, wherein when said base unit and a corresponding application module have been cooperatively assembled, the combination is capable of performing one or more predetermined end-user functions, the end-user functions provided by a given application module being specific to a single application, and said display comprised by said base unit is enabled to display an application-specific GUI, and wherein neither said base unit nor said application module is operable to perform said predetermined end-user functions without the other.

2. An instrument, comprising in combination a base unit and an application module, said base unit providing predetermined non-application-specific functions, and comprising a display device for display of a graphical user interface (GUI), said predetermined non-application-specific functions provided by said base unit including generic control functions required to operate said display device, said base unit being adapted to be assembled to a corresponding application-specific application module selected from a group thereof, each application module mating with said base unit in accordance with a predetermined physical and electrical interface, and each said application module storing application-specific program data and software, including application-specific GUI software, and providing application-specific physical interface means for providing predetermined application-specific communication with an apparatus, device, or system to be tested, and wherein when said base unit and a corresponding application module have been cooperatively assembled, the combination is capable of performing one or more predetermined end-user functions, the end-user functions provided by a given application module being specific to a single application, and said display comprised by said base unit is enabled to display an application-specific GUI.

3. The instrument of claim 2, wherein neither said base unit nor said application module is operable to perform said predetermined end-user functions without the other.

4. The instrument of claim 2, wherein said display device comprised by said base unit is a touch-sensitive display operated by said generic control functions provided by said base unit to accept user input responsive to a user contacting predetermined areas thereof, whereby said predetermined areas of said touch-sensitive display may be defined differently with respect to different end-user functions by application-specific software stored by said different application modules, as part of ASGUIs defined for each application.

5. The instrument of claim 2, wherein an ASGUI is defined for each application-specific end-user function by provision of a sequence of screens of information each identifying one or more areas on said display device for prompting user input, the sequence of said screens displayed in any given operation of said instrument to perform an end-user function varying responsive to the input provided by the user responsive to said prompting information.

6. The instrument of claim 5, wherein said specific application is telecommunications testing, comprising the testing of one or more of a telecommunications apparatus, communication facility, or overall system operation, and wherein an application module is selected corresponding to the communication protocol implemented by said apparatus, facilities, or systems, and is assembled to said base unit for telecommunications testing thereof.

7. The instrument of claim 6, wherein said sequence of screens provided to a user for telecommunications testing includes one or more screens giving the user the option to select an end-user function, and wherein the user may specify a given end-user function by individual input of parameters for controlling said application module to perform a given test in order to test an associated apparatus, facility, or system, or by selecting a predetermined test from a library of tests stored by said application module, each stored test comprising a corresponding selection of said parameters.

8. The instrument of claim 2, wherein said different application modules each include memory means storing ASGUI software defining an ASGUT for the corresponding application-specific end-user functions, and wherein said non-application-specific software stored by said base unit comprises GUI software for copying and storing said ASGUI software from said application module, and for then displaying the sequence of screens defined by said ASGUI on said display.

9. The instrument of claim 8, wherein said base unit comprises polling software for determining an identification of ASGUI software stored by an associated application module when assembled to said base unit, for determining whether said ASGUI software has previously been stored by said base unit, and, if not, for copying said ASGUI software from said application module to said base unit for displaying the sequence of screens defined by said ASGUI on said display.

10. The instrument of claim 9, wherein said base unit and said application modules each comprise separate housings adapted to be conveniently assembled to one another to form a structurally integral unit, and wherein said polling software comprised by said base unit operates automatically without user input upon such assembly.

11. The instrument of claim 2, wherein said base unit and said application modules each comprise separate housings adapted to be conveniently assembled to one another to form a structurally integral unit, and wherein said base unit comprises means, operated automatically without user input upon such assembly, for identifying said application module and for copying said application-specific program data and software stored by said application module into said base unit as needed for performance of said end-user functions.

12. The instrument of claim 2, wherein said base unit comprises power supply means for powering both said base unit and said application module when connected thereto, said application-specific program data and software stored by said application module being stored in non-volatile memory.

13. The instrument of claim 12, wherein said power supply means comprised by said base unit comprises a battery and battery condition monitor means, said battery condition monitor means providing a signal to said application module if said battery is detected to be significantly discharged, and said application module comprising means for responding thereto by storing updated data.

14. The instrument of claim 13, wherein latching deadman relay means connecting input and output connections of said instrument are also set upon detection of said signal.

15. An instrument, comprising in combination a base unit and an application module, said base unit providing predetermined non-application-specific functions, and comprising a display device for display of a graphical user interface (GUI), said predetermined non-application-specific functions provided by said base unit including generic control functions required to operate said display device, said base unit being adapted to be assembled to a corresponding application-specific application module selected from a group thereof, each application module mating with said base unit in accordance with a predetermined physical and electrical interface, and each said application module storing application-specific program data and software, including application-specific GUI (ASGUI) software, and providing application-specific physical interface means for providing predetermined application-specific communication with an apparatus, device, or system to be tested, and wherein when said base unit and a corresponding application module have been cooperatively assembled, (1) the combination is capable of performing one or more application-specific functions that cannot be performed by said base unit in the absence of the application module, and (2) said display comprised by said base unit is enabled to display an application-specific GUI (ASGUI).

16. The instrument of claim 15, wherein said display device comprised by said base unit is a touch-sensitive display operated by said generic control functions provided by said base unit to accept user input responsive to a user contacting predetermined areas thereof, whereby said predetermined areas of said touch-sensitive display may be defined differently with respect to different application-specific functions by application-specific software stored by said different application modules, as part of ASGUIs defined for the corresponding application.

17. The instrument of claim 15, wherein an ASGUI is defined for each application-specific function by provision of a sequence of screens of information each identifying one or more areas on said display device for prompting user input, the sequence of said screens displayed in any given operation of said instrument to perform an application-specific function varying responsive to the input provided by the user responsive to said prompting information.

18. The instrument of claim 17, wherein said specific application is telecommunications testing, comprising the testing of a telecommunications apparatus, communication facility, or overall system operation, and wherein an application module is selected corresponding to the communication protocol implemented by said apparatus, facility, or systems, and is assembled to said base unit for testing thereof.

19. The instrument of claim 18, wherein said sequence of screens provided to a user for telecommunications testing includes one or more screens giving the user the option to select an application-specific test, and wherein the user may specify a given application-specific test by individual input of parameters for controlling said application module to perform a given test in order to test an associated apparatus, facility, or system, or by selecting a predetermined test from a library of tests stored by said application module, each stored test comprising a corresponding selection of said parameters.

20. The instrument of claim 15, wherein said different application modules each include memory means storing ASGUI software defining an ASGUI for the corresponding application-specific functions, and wherein said non-application-specific software stored by said base unit comprises GUI software for copying and storing said ASGUI software from said application module, and for then displaying the sequence of screens defined by said ASGUI on said display.

21. The instrument of claim 20, wherein said base unit comprises polling software for determining an identification of ASGUI software stored by an associated application module when assembled to said base unit, for determining whether said ASGUI software has previously been stored by said base unit, and, if not, for copying said ASGUI software from said application module to said base unit for displaying the sequence of screens defined by said ASGUI on said display.

22. The instrument of claim 21, wherein said base unit and said application modules each comprise separate housings adapted to be conveniently assembled to one another to form a structurally integral unit, and wherein said polling software comprised by said base unit operates automatically without user input upon such assembly.

23. The instrument of claim 15, wherein said base unit and said application modules each comprise separate housings adapted to be conveniently assembled to one another to form a structurally integral unit, and wherein said base unit comprises means, operated automatically without user input upon such assembly, for identifying said application module and for copying said application-specific program data and software stored by said application module into said base unit as needed for performance of said application-specific functions.

24. The instrument of claim 23, wherein said base unit comprises power supply means for powering both said base unit and said application module when connected thereto, said application-specific program data and software stored by said application module being stored in non-volatile memory.

25. The instrument of claim 24, wherein said power supply means comprised by said base unit comprises a battery and battery condition monitor means, said battery condition monitor means providing a signal to said application module if said battery is detected to be significantly discharged, and said application module comprising means for responding thereto by storing updated data.

26. The instrument of claim 25, wherein latching deadman relay means connecting input and output connections of said instrument are also set upon detection of said signal.

27. A base unit adapted to be assembled to an application module selected from a group thereof in order to comprise an instrument capable of performing application-specific functions, said base unit comprising:
  display means for providing a graphical user interface (GUI),
  a power supply,
  an external communications interface,
  memory means for storing non-application-specific software for performing external communication functions and for supporting generic user interface functions, and
  connection means providing a predetermined physical and electrical interface whereby said base unit may be connected to an application module selected from a group thereof conforming to said predetermined physical and electrical interface,
  wherein each said application module of said group thereof comprises application-specific physical interface means for providing predetermined application-specific communication with an apparatus, device, or system to be tested, and stores application-specific program data and software, including application-specific GUI (ASGUI) software,
  wherein when said base unit and a corresponding application module selected from a group thereof have been cooperatively assembled, (1) the combination is capable of performing one or more application-specific functions that cannot be performed by said base unit in the absence of the application module, and (2) said display comprised by said base unit is enabled to display an application-specific GUI (ASGUI).

28. The base unit of claim 27, wherein said display device comprised by said base unit is a touch-sensitive display operated by said non-application-specific software to accept user input responsive to a user contacting predetermined areas thereof, whereby said predetermined areas of said touch-sensitive display may be defined differently with respect to different application-specific functions by application-specific software stored by said different application modules, as part of ASGUIs defined for each application.

29. The base unit of claim 27, wherein application-specific software stored by said different application modules defines an ASGUI for each application-specific function by provision of a sequence of screens of information each identifying one or more areas on said display device for prompting user input, the sequence of said screens displayed in any given operation of said instrument to perform an application-specific function varying responsive to the input provided by the user responsive to said prompting information.

30. The base unit of claim 27, wherein said different application modules to which said base unit is adapted to be connected each include memory means storing ASGUI software defining an ASGUI for the corresponding application-specific functions, and wherein said non-application-specific software stored by said base unit comprises GUI software for copying and storing said ASGUI software from said application module, and for then displaying the sequence of screens defined by said ASGUI on said display.

31. The base unit of claim 30, wherein said base unit comprises polling software for determining an identification of ASGUI software stored by an associated application module when assembled to said base unit, for determining whether said ASGUI software has previously been stored by said base unit, and, if not, for copying said ASGUI software from said application module to said base unit for displaying the sequence of screens defined by said ASGUI on said display.

32. The base unit of claim 31, wherein said base unit and said application modules each comprise separate housings adapted to be conveniently assembled to one another to form a structurally integral unit, and wherein said polling software comprised by said base unit operates automatically without user input upon such assembly.

33. The base unit of claim 27, wherein said base unit and said application modules each comprise separate housings adapted to be conveniently assembled to one another to form a structurally integral unit, and wherein said base unit comprises means, operated automatically without user input upon such assembly, for identifying said application module and for copying said application-specific program data and software stored by said application module into said base unit as needed for performance of said application-specific functions.

34. The base unit of claim 27, wherein said base unit comprises power supply means for powering both said base unit and said application module when connected thereto, said application-specific program data and software stored by said application module being stored in non-volatile memory.

35. The base unit of claim 34, wherein said power supply means comprised by said base unit comprises a battery and battery condition monitor means, said battery condition monitor means providing a signal to said application module if said battery is detected to be significantly discharged, and said application module comprising means for responding thereto by storing updated data.

36. The base unit of claim 35, further comprising latching deadman relay means connecting input and output connections of said base unit, said relay means being set upon detection of said signal.

37. A method of assembling a instrument specialized for performance of one or more predetermined end-user functions, said instrument comprising a base unit, including user interface means comprising a display device for display of a graphical user interface (GUI), and means for storing generic GUI software providing non-application-specific GUI functions including generic control functions required to operate said display device and to obtain user input, and an application module selected from a group of such application modules, each such application module providing application-specific physical interface functions and storing application-specific program data and software, including functional and user interface software for controlling said display device to display an application-specific GUI (ASGUI) for prompting a user to perform predetermined application-specific steps and input application-specific required information needed to select and perform a corresponding predetermined end-user function not capable of being performed by either said application module or said base unit in the absence of the other, said method comprising the steps of:

selecting from a group of such application modules an application module providing application-specific physical interface functions and storing application-specific program data and software appropriate to a predetermined end-user function of interest;

physically assembling said selected application module to said base unit to form a structurally integral unit, such that signal-communicating electrical connections are made therebetween;

copying said application-specific program data and software from said selected application module to said base unit as required; and operating said user interface means in accordance with said application-specific program data and software to control said display device to display said application-specific GUI (ASGUI) and thereby to prompt a user to perform predetermined application-specific steps and input application-specific required information needed to select and perform a predetermined end-user function, and operating said selected application module in accordance with said application-specific functional and ASGUT software to perform said selected end-user function.

38. The method of claim 37, wherein said display device and said user interface means comprised by said base unit together comprise a touch-sensitive display operated by said base unit to accept user input responsive to a user contacting predetermined areas thereof, whereby said predetermined areas of said touch-sensitive display may be defined differently with respect to different applications by application-specific GUI software stored by different application modules, as part of an ASGUI defined for each application.

39. The method of claim 37, wherein an ASGUI is defined for each application-specific end-user function by provision of a sequence of screens of information each identifying one or more areas on said display device for prompting user input, the sequence of said screens displayed in any given operation of said instrument to perform an end-user function varying responsive to the input provided by the user responsive to said prompting information.

40. The method of claim 39, wherein said application is telecommunications testing, and said application-specific end-user functions comprise testing of one or more of a telecommunications apparatus, communication facility, or overall system operation, and wherein an application module is selected providing physical interface functions corresponding to the communication protocol implemented by said apparatus, facilities, or systems.

41. The method of claim 40, wherein said sequence of screens provided to a user for telecommunications testing includes one or more screens giving the user the option to select an end-user function for performance, to specify a given test by individual input of parameters for controlling said instrument to perform a given test in order to test an associated apparatus, facility, or system, or to select a predetermined test from a library of tests stored by said application module, each stored test comprising a corresponding selection of said parameters.

42. The method of claim 39, comprising the further steps of said base unit polling an associated application module when assembled to said base unit for determining an identification of ASGUI software stored thereby, determining whether said ASGUI software has previously been stored by said base unit, and if not, copying said ASGUI software from said application module to said base unit.

43. The method of claim 42, wherein said base unit and said application modules each comprise separate housings adapted to be conveniently assembled to one another to form a structurally integral unit, and wherein said polling step is performed by said base unit automatically without user input upon such assembly.

44. The method of claim 32, wherein said base unit and said application modules each comprise separate housings adapted to be conveniently assembled to one another to form a structurally integral unit, and wherein said base unit determines the extent to which said application-specific program data and software has not been previously copied from said application module to said base unit and copies said application-specific program data and software from said application module to said base unit as required automatically and without user input upon such assembly.

45. The method of claim 37, wherein said base unit comprises power supply means for powering said base unit and said application module upon assembly thereof, said application module comprising non-volatile memory for storing said application-specific functional and user interface software.

46. The method of claim 45, wherein said power supply means comprised by said base unit comprises a battery and battery condition monitor means, and said method further comprises the steps of said battery condition monitor means providing a signal to said application module if said battery is detected to be significantly discharged, and said application module responding thereto by storing updated data.

47. The method of claim 46, wherein latching deadman relay means connecting input and output connections of said instrument are also set upon detection of said signal.

48. The method of claim 37, wherein said signal-communicating electrical connections made between said application module to said base unit upon their assembly are effected by insertion of a multipin male connector into a multipin female receptacle, and said signals include the following:
   Power ground
   Bidirectional handshake
   Bidirectional asynchronous data
   Power from base unit to application module
   Application Module Present.

49. The method of claim 48, wherein said signals further include the following:
   Audio ground
   Speaker audio
   Microphone audio
   Loss of Power Warning.

50. The method of claim 48, wherein said step of copying said application-specific user interface software from said application module to said base unit as required is performed upon detection of the Application Module Present signal upon physical assembly of said application module to said base unit to form a structurally integral unit, such that said signal-communicating electrical connections are made therebetween.

51. The instrument of claim 1, wherein said display device comprised by said base unit is a touch-sensitive display operated by said generic control functions provided by said base unit to accept user input responsive to a user contacting predetermined areas thereof, whereby said predetermined areas of said touch-sensitive display may be defined differently with respect to different end-user functions by application-specific software stored by said different application modules, as part of ASGUIs defined for each application.

52. The instrument of claim 1, wherein an ASGUI is defined for each application-specific end-user function by provision of a sequence of screens of information each identifying one or more areas on said display device for prompting user input, the sequence of said screens displayed in any given operation of said instrument to perform an end-user function varying responsive to the input provided by the user responsive to said prompting information.

53. The instrument of claim 52, wherein said specific application is telecommunications testing, comprising the the testing of one or more of a telecommunications apparatus, communication facility, or overall system operation, and wherein an application module is selected corresponding to the communication protocol implemented by said apparatus, facilities, or systems, and is assembled to said base unit for telecommunications testing thereof.

54. The instrument of claim 53, wherein said sequence of screens provided to a user for telecommunications testing includes one or more screens giving the user the option to select an end-user function, and wherein the user may specify a given end-user function by individual input of parameters for controlling said application module to perform a given test in order to test an associated apparatus, facility, or system, or by selecting a predetermined test from a library of tests stored by said application module, each stored test comprising a corresponding selection of said parameters.

55. The instrument of claim 52, wherein said different application modules each include memory means storing ASGUI software defining an ASGUI for the corresponding application-specific end-user functions, and wherein said non-application-specific software stored by said base unit comprises GUI software for copying and storing said ASGUI software from said application module, and for then displaying the sequence of screens defined by said ASGUI on said display.

56. The instrument of claim 55, wherein said base unit comprises polling software for determining an identification of ASGUI software stored by an associated application module when assembled to said base unit, for determining whether said ASGUI software has previously been stored by said base unit, and, if not, for copying said ASGUI software from said application module to said base unit for displaying the sequence of screens defined by said ASGUI on said display.

57. The instrument of claim 56, wherein said base unit and said application modules each comprise separate housings adapted to be conveniently assembled to one another to form a structurally integral unit, and wherein said polling software comprised by said base unit operates automatically without user input upon such assembly.

58. The instrument of claim 1, wherein said base unit and said application modules each comprise separate housings adapted to be conveniently assembled to one another to form a structurally integral unit, and wherein said base unit comprises means, operated automatically without user input upon such assembly, for identifying said application module and for copying said application-specific program data and software stored by said application module into said base unit as needed for performance of said end-user functions.

59. The instrument of claim 58, wherein said base unit comprises power supply means for powering both said base unit and said application module when connected thereto, said application-specific program data and software stored by said application module being stored in non-volatile memory.

61. The instrument of claim 59, wherein said power supply means comprised by said base unit comprises a battery and battery condition monitor means, said battery condition monitor means providing a signal to said application module if said battery is detected to be significantly discharged, and said application module comprising means for responding thereto by storing updated data.

61. The instrument of claim 60, wherein latching deadman relay means connecting input and output connections of said instrument are also set upon detection of said signal.

* * * * *